(12) United States Patent
Mithal et al.

(10) Patent No.: US 10,401,870 B1
(45) Date of Patent: Sep. 3, 2019

(54) SYSTEM AND METHOD FOR HANDLING ITEMS USING MOVABLE-BOTS

(71) Applicant: GREY ORANGE PTE. LTD., Singapore (SG)

(72) Inventors: Tejit Mithal, Gurgaon (IN); Gaurav Kejriwal, Benares (IN); Ankit Mittal, Delhi (IN)

(73) Assignee: GREY ORANGE PTE. LTD., Singapore (SG)

(*) Notice: Subject to any disclaimer, the term of this patent is extended or adjusted under 35 U.S.C. 154(b) by 0 days.

(21) Appl. No.: 16/192,686

(22) Filed: Nov. 15, 2018

(51) Int. Cl.
*G05D 1/02* (2006.01)
*G05D 1/00* (2006.01)
*B65G 43/10* (2006.01)
*B25J 9/16* (2006.01)
*G05B 19/418* (2006.01)

(52) U.S. Cl.
CPC .......... *G05D 1/0293* (2013.01); *B25J 9/1666* (2013.01); *B65G 43/10* (2013.01); *G05B 19/41815* (2013.01); *G05D 1/0027* (2013.01); *G05D 1/0289* (2013.01)

(58) Field of Classification Search
CPC ... G05D 1/0289; G05D 1/0027; G05D 1/0293
See application file for complete search history.

(56) References Cited

U.S. PATENT DOCUMENTS

| | | | | |
|---|---|---|---|---|
| 5,091,855 A * | 2/1992 | Umehara | ......... | G05B 19/41895 180/168 |
| 5,283,739 A * | 2/1994 | Summerville | ....... | G05D 1/0289 180/168 |
| 6,285,929 B1 * | 9/2001 | Hashimoto | ............ | G05D 1/024 180/168 |
| 6,654,647 B1 * | 11/2003 | Kal | ....... | G05D 1/0282 180/167 |
| 7,178,660 B2 * | 2/2007 | Dehne | ..................... | B62D 65/18 104/287 |
| 7,757,946 B2 * | 7/2010 | Kienzle-Lietl | ........... | G01G 9/00 235/383 |
| 9,827,683 B1 * | 11/2017 | Hance | ....................... | B25J 9/162 |
| 2006/0092014 A1 * | 5/2006 | Onderko | ............ | G06K 7/10336 340/539.13 |
| 2006/0229804 A1 * | 10/2006 | Schmidt | ............... | G05D 1/0278 701/466 |
| 2007/0233337 A1 * | 10/2007 | Plishner | ............... | G05D 1/0295 701/23 |
| 2014/0172223 A1 * | 6/2014 | Murphy | ............... | G05D 1/0289 701/25 |
| 2014/0358338 A1 * | 12/2014 | Harasaki | ........... | H01L 21/67715 701/19 |
| 2018/0120862 A1 * | 5/2018 | Dembinski | ......... | B61L 27/0022 |

* cited by examiner

*Primary Examiner* — Thomas Randazzo
(74) *Attorney, Agent, or Firm* — Oblon, McClelland, Maier & Neustadt, L.L.P.

(57) ABSTRACT

A method for handling items using a plurality of movable-bots includes defining a conveyance path to be followed by the plurality of movable-bots, where the conveyance path is configured as a closed loop. The method further includes defining, for each of the plurality of movable-bots, a plurality of path attributes associated with the conveyance path. The method further includes instructing each of the plurality of movable-bots to synchronize a movement with respect to at least one other movable-bot based on the plurality of path attributes when moving along the conveyance path.

29 Claims, 7 Drawing Sheets

SYSTEM AND METHOD FOR HANDLING ITEMS USING MOVABLE-BOTS

TECHNICAL FIELD

The present disclosure relates generally to methods and systems for handling of items. Specifically, the present disclosure relates to use of movable-bots for sorting and transferring of items.

BACKGROUND

In recent years, there has been a growing demand for industrial goods in day to day life. In order to meet the increased demand for industrial goods, industries need to maintain a sustainable demand and supply ratio. Traditionally, industries used to employ humans for sorting and transferring of inventory items. However, the employment of humans in such sorting facilities generally tend to be costly as well as prone to mistakes and may also be time consuming. Many such sorting facilities have resorted to conveyor belt systems which were introduced as a carrying medium in order to reduce cost and time consumption in transferring of items from one location to another within the facility.

Generally, the conveyor belt system utilizes two or more rollers configured with a conveyor belt as the carrying medium for the transfer of items from one end to the other. The items are placed over the conveyor belts and are transferred from one location to another by the movement of the conveyor belts. However, the use of a conveyor belt system comes with its own disadvantages and challenges. For example, a conveyor belt system is a fixed system with a belt assembly installed at a certain location in the sorting facility. Therefore, any required change in pickup and drop points, or relocation of the whole conveyor belt system, if needed, is quite challenging, and sometimes even impossible. Moreover, the conveyor belt system being a fixed system, does not allow for any change in the throughput thereof. Furthermore, failure of any one component of the conveyor belt system results in non-functioning of the entire system. Additionally, the conveyor belt system does not allow distributive clearance between the items place thereon, which could result in hazardous accidents.

Therefore, in light of the foregoing discussion, there exists a need to overcome the aforementioned drawbacks associated with the traditional systems for carrying and handling of items while being transferred from one location to another.

SUMMARY

The present disclosure seeks to provide a method for handling items using a plurality of movable-bots. The present disclosure seeks to provide a solution to the existing problem of handling items using a plurality of movable-bots. An aim of the present disclosure is to provide a solution that overcomes at least partially the problems encountered in the prior art, and provides reliable and efficient handling of items using a plurality of movable-bots.

According to an embodiment of the present disclosure, a method for handling items using a plurality of movable-bots includes defining a conveyance path to be followed by the plurality of movable-bots, where the conveyance path is as a closed loop. The method further includes defining, for each of the plurality of movable-bots, a plurality of path attributes associated with the conveyance path. The method further includes instructing each of the plurality of movable-bots to synchronize a movement with respect to at least one other movable-bot based on the plurality of path attributes when moving along the conveyance path.

According to an embodiment of the present disclosure, a system for handling items using a plurality of movable-bots includes a server arrangement. The server arrangement is operable to define a conveyance path to be followed by the plurality of movable-bots, the conveyance path configured as a closed loop. The server arrangement is further operable to define, for each of the plurality of movable-bots, a plurality of path attributes associated with the conveyance path. The server arrangement is further operable to instruct each of the plurality of movable-bots to synchronize a movement with respect to at least one other movable-bot based on the plurality of path attributes when moving along the conveyance path.

Embodiments of the present disclosure substantially eliminate or at least partially address the aforementioned problems in the prior art, and enables reliable and efficient handling of items using a plurality of movable-bots.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIGS. 5A-5C are schematic illustrations of movable-bots and operations thereof, in accordance with one or more embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

The present disclosure provides a reliable and efficient, method and system for handling items using a plurality of movable-bots. The present disclosure allows for items to be handled by movable-bots. The movable-bots are configured to operate at multiple pickup and drop points. The movable-bots transfer items by following a conveyance path that connects the pickup and drop locations. Furthermore, the conveyance path is a closed loop that the movable-bots are configured to traverse to connect the pickup and drop locations. Beneficially, the closed loop allows for a seamless movement of the movable-bot along a defined path connecting the pickup and drop location. Additionally, such seamless movement of the movable-bot along the defined path decreases the travel time of the movable-bot, and consequently enables an improved throughput of the system in picking up and dropping items in a warehouse or another manufacturing arrangement.

Moreover, the system is well equipped for reallocation of pickup and drop points in accordance with the flow of operations. Such systems, being modular in nature, allow for a change in position or relocation of the plurality of paths quite easily. Moreover, such systems are able to provide a higher throughput by increasing the number and speed of the movable-bots, if required. Furthermore, the movable-bots are operable to choose an easy and deterministic path for the operations assigned thereto. Beneficially, such systems are also operable to function efficiently even if one of the movable-bots is unable to function properly. Additionally, due to predefined timing and positioning of the movable-bots, collisions and congestions are easily avoided. More additionally, the present disclosure allows for precise merging and demerging of the movable-bots from the operation paths to the conveyance path and vice-versa due to implementation of well-defined time-windows. Notably, the aforementioned system is quite efficient and reliable in transferring of items from one location to another.

Throughout the present disclosure, the term "movable-bots" used herein relates to a robotic device operable to transfer items from one location to another. The movable-bots are operable to move along a predefined path to execute the operations assigned thereto. The predefined path may be a route, ways (e.g., curved/straight paths that may be high speed regions) and so forth. Furthermore, the movable-bots move by sliding, rolling and so forth over the route to travel the distance associated with it. The movable-bots require a power source to perform various functions associated thereto. Optionally, the power source may include a rechargeable battery and the like. The movable-bots may include devices such as automated guided vehicles (AGVs), unmanned guided vehicles (UGVs) and so forth. That is, the movable-bots are operated without on-board human presence.

Optionally, the movable-bot includes an actuating arrangement for picking and dropping of items. The actuating arrangement may be in the form of a tilt tray or a belt carriage. In the present examples, the tilt tray may be flipped by about 75 degrees for dropping the item therefrom. It should be possible to actuate the belt carriage in both the directions. Further, it should be possible to actuate the tilt tray or the carriage individually, simultaneously and in sync, or separately without any limitations. Further, the movable-bots may be adapted to provide feedback on sorting completion and in case of failure to actuate. Further, the movable-bots may be adapted to move simultaneously one behind the other, as and when required for any operation.

In some examples, the movable-bots may have obstacle detection distance as per a max speed of bot and a stopping distance. Obstacle detection may generally be possible only in a direction of motion and should be non-tactile (i.e., non-contact based detection). In some cases, secondary obstacle detection may also be available in case of failure of primary obstacle detection and can be tactile (i.e., contact based detection). Further, the automatic recovery or restart after removal of an obstacle shall be at least after a predetermined time (e.g., 2 seconds). The movable-bots may be designed to not topple upon an emergency/abrupt stop. Further, the one or more items placed on top of the movable-bots should not fall upon an emergency stop. The movable-bot may also be capable of detecting deviation from the guided path and come to a halt in no more than a predetermined distance (e.g., 2.1 meters).

In one embodiment, the acceleration of the movable-bot with a load is about 1 m/s$^2$ and without a load is about 1.2 m/s$^2$. Further, the deceleration of the movable-bot with a load is about 1 m/s$^2$ and without a load is about 1.2 m/s$^2$. The maximum swing radius of the movable-bot is about 445 mm, with a turning radius of 0 mm and turn-time of 90 degrees being less than 2 seconds.

The term "items" used herein relates to goods, material, products, and so forth. In an example, the items may include raw materials, finished products, and the like. The items could be in the form of polybags, cartons, and in a regular or an irregular shape, without any limitations. Furthermore, the movable-bots are operable to sort the items being transferred to a desired location and arrange the items precisely therein. Such movable-bots are programmed to perform automatically or may be controlled manually in real time by a remote operator. The movable-bots may be programmed to operate such that each of the individual movable-bots moves in sync with the other movable-bots in the same path. The movement of the movable-bots may depend upon various parameters. For example the movement may be associated with the distance between the individual movable-bots along the same path, an operating speed of each of the movable-bots, and the like.

According to some embodiments, the system includes a server arrangement. Throughout the present disclosure, the term "server arrangement" relates to a structure and/or module that includes programmable and/or non-programmable components configured to store, process and/or share information. Optionally, the server arrangement includes one of physical or virtual computational entities capable of enhancing information to perform various computational tasks. It should be appreciated that the server arrangement may be a single hardware server or plurality of hardware servers operating in a parallel or distributed architecture. In an example, the server arrangement may include components such as memory, a processor, a network adapter and the like, to store, process and/or share information with other computing components, such as user device/user equipment. Optionally, the server arrangement is implemented as a computer program that provides various services (such as database service) to other devices, modules or apparatuses.

According to some embodiments, the method for handling items using a plurality of movable-bots includes defining a conveyance path to be followed by the plurality of movable-bots for a duty-cycle, where the conveyance path is configured to be a closed loop. The server arrangement is operable to define a conveyance path to be followed by the plurality of movable-bots for the duty-cycle. It will be appreciated that the term "conveyance path" relates to routes, ways (e.g., curved/straight paths that may be high speed regions), and the like, associated with the plurality of movable bots for transferring of items. Furthermore, the conveyance path is considered as a major path for transferring of items and also covers the longest distance of travel within the entire system. It may be understood that the plurality of movable-bots starts their operations on the conveyance path for transferring the items. The plurality of movable-bots may spend a maximum travel time during their operations on the conveyance path. Additionally, the plurality of movable-bots moves at their maximum speed along the conveyance path to provide a maximum throughput.

According to some embodiments, the method further includes defining a plurality of operation paths for the duty-cycle, where the conveyance path and each of the plurality of operation paths combine to form a fixed-closed loop. For example, the server arrangement is operable to define a plurality of operation paths for the duty-cycle, where the conveyance path and each of the plurality of operation paths combine to form a fixed-closed loop. The plurality of operation paths and the conveyance path are combined to form a fixed-closed loop to provide a continuous and uniform flow to the work process. In one example, one of the plurality of operation paths combines with the conveyance path to provide a fixed-closed loop. In another example, two or more of the plurality of operation paths combine with the conveyance path to provide a fixed-closed loop. In some embodiments, the plurality of operation paths for the duty-cycle are defined based on the work process to be performed by the plurality of movable-bots.

In some embodiments, the duty-cycle relates to a complete work process (including, transferring, sorting, and the like) that is performed by the plurality of movable-bots. The duty-cycle involves the manual and/or automatic feeding of the items from a storage area or conveyor belts onto the movable-bots; and further entering of the movable-bots into the conveyance path and thereafter identification, merging and subsequent demerging of the movable-bots into and from the one or more operation paths for performing a required operation. In one or more examples, the duty-cycle also involves scanning, weighing, and dimensioning of the items placed on the movable-bots to facilitate with completing the necessary operation thereof.

The length of the conveyance path may be greater than the length of any one or more of the operation path so that the conveyance path could connect the various operation paths for allowing the movable-bots to transfer therefrom to one of the operation paths (as required). This further provides that the movable-bots, generally, cover most of the distance to be traversed for any given operation in the conveyance path as compared to the operation paths, and since the movable-bots may travel at higher speed in the conveyance path as compared to the operation path, this would result in faster and efficient overall operation.

In some embodiments, the conveyance path is configured to form a closed loop. In one example, the conveyance path may be a circular shape, oval shape, a winding path, or any other closed loop that does not include sharp changes in direction. In other embodiments, a rectangular, triangular or any other suitable shape may be utilized without any limitations. The corners of the shapes may be rounded or otherwise modified to allow the plurality of movable-bots to move at higher speeds. In some embodiments, a guiding arrangement (e.g., rail system) may be provided to allow the plurality of movable-bots to change directions at higher speeds. In an example, the server arrangement quantifies the amount of work in terms of number of items, weight of items, and so forth involved in the duty-cycle, and designates the conveyance path based thereon. In another example, the server arrangement is operable to analyse the duty-cycle and thereby define the conveyance path to be followed by the plurality of movable-bots to perform various work processes. In one or more examples, the conveyance path may allow entry and exit of the plurality of movable-bots arbitrarily from any of the points thereon. Generally, the length of the conveyance path may be longer than the length of any of the operation paths to maintain high speed for the overall operation to obtain higher throughput.

In one embodiment, a length of the conveyance path constitutes about 60 to 100 percent of a total length of the fixed-closed loop. The length of the conveyance path may be defined based on the assigned work processes at the start of the duty-cycle. In an example, the work processes assigned at the start of the duty-cycle may be defined in a manner that 60 percent of a path travelled by the moveable-bot to complete the assigned processes is within the conveyance path of the fixed-closed loop. In another example, the work processes assigned at the start of the duty-cycle may be defined in a manner that 90 percent of a path travelled by the moveable-bot to complete the assigned processes is within the conveyance path of the fixed-closed loop. In yet another example, the work processes assigned at the start of the duty-cycle may be defined in a manner that 100 percent of a path travelled by the moveable-bot to complete the assigned processes is within the conveyance path of the fixed-closed loop.

In one embodiment, a total length of the plurality of operation paths constitutes about 0 to a predetermined percentage (e.g., 40 percent) of the total length of the fixed-closed loop. The total length of the plurality of operation paths are defined based on the assigned work processes at the start of the duty-cycle. In an example, the work processes assigned at the start of the duty-cycle may be defined in a manner that 40 percent of a path travelled by the moveable-bot to complete the assigned processes is within the plurality of operation paths of the fixed-closed loop. In another example, the work processes assigned at the start of the duty-cycle may be defined in a manner that 10 percent of a path travelled by the moveable-bot to complete the assigned processes is within the plurality of operation paths of the fixed-closed loop. In yet another example, the work processes assigned at the start of the duty-cycle may be defined in a manner that a path travelled by the moveable-bot to complete the assigned processes may not include traversing through the plurality of operation paths (i.e., the plurality of operation paths constitute 0 percent of the fixed-closed loop). In some embodiments, the plurality of operation paths are subsidiary parts of the entire system, and thereby, the total length of the plurality of operation paths is less than the length of the conveyance path in the fixed-closed loop. In one or more examples, the plurality of movable-bots moves along the plurality of operation paths with a relatively lower range of speed with respect to the conveyance path, as discussed below in further detail.

In some embodiments, the length of the conveyance path is kept in between 60 to 100 percent of total length because when the length of conveyance path is 50% of the total length, the operating speed becomes half, and when the length of the conveyance path is at 60% of the total length, a weighted average of the speed provides a higher average operational speed to the movable-bots. Thus 60 to 100 percent range of the length increases the average speed of the movable-bots during operation, and therefore, results in more efficient overall operation.

The method for handling items using the plurality of movable-bots includes defining a plurality of path attributes associated with the conveyance path, for each of the plurality of movable-bots. Herein, the server arrangement is operable to define a plurality of path attributes associated with the conveyance path, for each of the plurality of movable-bots. The server arrangement provides a set of instructions to the plurality of movable-bots based on the work processes to be performed thereby. In one example, the plurality of path attributes associated with the conveyance path is defined based on the number of functions involved in the work process.

In one embodiment, the plurality of path attributes includes one or more of a maximum speed for each of the plurality of movable-bots, a maximum acceleration for each of the plurality of movable-bots, an entry point, and an exit point. For example, the plurality of movable-bots is configured to move at a maximum speed (for example, 60 kilometers per hour), a maximum acceleration (for example, 100 meter per second square) based on the length of the conveyance path. Additionally, the entry points and exit points on the conveyance path are defined based on the work process. Furthermore, as discussed above, the conveyance path may allow entry and exit of the plurality of movable-bots arbitrarily from any of the entry points and exit points thereon.

In one embodiment, the method further includes defining one or more operations associated with each of the plurality of operation paths for each of the plurality of movable-bots. For example, the server arrangement may be further operable to define one or more operations associated with each of the plurality of operation paths for each of the plurality of movable-bots. The one or more operations may be defined based on the number of items, types of items, location of items, and so forth. The one or more operations may include transfer of items, sorting of items, and so forth. Additionally, the one or more operations may include information about distance of travel, direction of travel, travelling speed, and so forth for the at least one of the plurality of movable-bots. Additionally, the plurality of movable-bots may be configured with a certain number of operations that are to be performed simultaneously. For example, the plurality of movable-bots may be programmed to manoeuvre around a work station and transfer goods from one location to the other while maintaining relative speeds and relative distances therebetween. Additionally, the movable-bots may be configured such that the movable-bots do not collide with each other while performing the defined operations. Furthermore, the plurality of movable-bots may be programmed to repeat a certain number of operations periodically. In order to meet the desired throughput and efficient material handling, the movable-bots may be restricted to a specified area of function and to operate at a specified travelling speed.

In one embodiment, the one or more operations associated with each of the plurality of operation paths includes one of retrieving identity information of an item at a scanning point, where the identity information includes at least one of a unique identifier of the item and a weight of the item and dimensions of the item. In general, the identity information of the item represents a unique identity (e.g., the item type information, such as cosmetic products, glassware, etc.), weight information (e.g., light weighted or heavy weighted) of the item, and dimension information of the item. It should be appreciated that the moveable-bots are capable of handling multiple items of same or different types without any limitations.

In some embodiments the items being transferred from one location to another are passed through the scanning point. The items may include one of an optical barcode, machine readable strips, and so forth. For such operation, the system further includes at least one scanner arranged at the scanning points. It will be appreciated that the scanner may be any electronic device operable to read the optical barcode, machine readable strips, and the like. The scanner arranged at the scanning points is operable to detect the items being scanned and retrieves the identity information of the item at the scanning point. That is, the scanner receives the identity information of the item and checks the storage of the server arrangement to retrieve the information related to the item being scanned. Subsequently, the scanner performs analysis of the classification of the item based on the retrieved identity information. Consequently, based on the retrieved identity information, further operations may be defined and performed. In one or more examples, the identity information may be utilized to obtain information about a storage location of the item, distance of travel, the particular operation path to be taken along with the conveyance path, and/or speed to be maintained during the travel.

As discussed, in some examples, the operation path may be determined based on the identity information, such as one or more of weight and volume of the item. For instance, the duty-cycle may involve sorting of the items to be shipped to various Postal Index Number (pin) codes or zip codes in a location. In this situation, the identity information may be utilized, for example, to decide the shipping method employed for transporting the item and accordingly the drop point of the item. For example, if the item weighs more than a certain predefined weight, then the item may be dropped at point 'A' while items weighting less than the predefined weight may be dropped at point 'B' in one or more of the operation paths.

It will be appreciated that one or more scanning points may be located at any position along the conveyance path, and once the item is scanned, the corresponding movable-bot carrying the item may be directed to an appropriate operation path concerning the scanned item. In some cases, a scanning point may be located right after the appropriate operation path (as determined), and in such cases, the movable-bot may have to traverse the entire conveyance path to come back to the appropriate operation path for entering therein.

In one embodiment, the plurality of path attributes includes a speed of the movable bot moving in the operation path. As discussed above, the maximum speed and the maximum acceleration for each of the plurality of movable-bots moving along the conveyance path may be relatively higher than the operation path. Furthermore, the maximum speed depends on various factors such as type of material, distance of travel, and/or number of operations to be performed. Specifically, the average speed of the closed loop is maintained according to the characteristics of the conveyance path and operation paths. The plurality of movable-bots may have adequate speed for both of the conveyance path and the operation path to provide sufficient output for the one or more operations. It may be understood that maintaining adequate speed provides overall faster and efficient operation.

Furthermore, an effective speed of a movable-bot along each operation path of the plurality of operation paths refers to an average travel time of the movable-bot with respect to the time for the moveable-bot to perform an operation associated therein. For example, the effective speed of the moveable bot along an operation path is measured from the time the moveable bot enters the operation path, performs an operation, and exits the operation path. If a moveable bot takes 3 minutes to enter the operation path, perform the operation, and exit the operation, the effective speed for this moveable bot is 3 minutes/operation. It will be appreciated that the time for the moveable-bot to perform an operation considers one or more events occurring during time the moveable-bot is performing the operation, such as manoeuvring to avoid collision with other movable-bots, manoeuvring around a work station and transfer goods, maintaining desired speed for efficient material handling by accelerating and/or decelerating, and the like. Moreover, the plurality of operation paths enables each of the movable-bots to perform operations such as, receiving the item at a pickup point, retrieving identity information at a scanning point and the like. Furthermore, the conveyance path connects the pickup and drop locations, enables synchronizing movement of each of the movable-bots based on the plurality of path attributes when moving, and allows entry and exit of the plurality of movable-bots arbitrarily from any points of the conveyance path. Therefore, the maximum speed of each of the movable-bots along the conveyance path may be greater than the effective speed of each movable-bot along the plurality of operation paths.

In one embodiment, the maximum speed along the conveyance path is in a range of 1.5 to 10 times of an effective speed of each movable-bot along the plurality of operation paths. In an example, an effective speed of a movable-bot 'X' along the plurality of operation paths is 6 kilometers per hour. In this situation, the maximum speed of the movable-bot 'X' along the conveyance path is within the range of 9 kilometers per hour to 60 kilometers per hour. It may be understood that maintaining a higher effective speed of the movable-bots along the conveyance path as compared to the corresponding operation paths provides overall faster and efficient operation.

In one embodiment, the plurality of path attributes includes an entry point, for each of the plurality of movable-bots, from an operation path into the conveyance path, and an exit point, for each of the plurality of movable-bots, from the conveyance path into the operation path. Furthermore, the conveyance path may connect with the plurality of operation paths at the entry and exit points. In one or more examples, the speeds of the movable bots may be adjusted while crossing the entry points and exit points. For example, the speeds of the movable bots may be decreased while crossing the entry points and exit points. In another example, the speeds of the movable bots may be decreased before or after crossing the entry points and exit points.

In one embodiment, the one or more operations associated with each of the plurality of operation paths includes receiving the item at a pickup point. For example, the items being transferred are placed on the plurality of movable-bots at the pickup point. The operation of placing items on the plurality of movable-bots may be performed manually or automatically. The pickup point may be an initial location or an intermediate location of the path to be travelled by the plurality of movable-bots.

In one another embodiment, the defined one or more operations includes delivering the item at a drop point. For example, the plurality of movable-bots receives the item and delivers the item at a drop point based on retrieved identity information. The pickup point may be an initial location or an intermediate location on the path to be travelled by the plurality of movable-bots to reach the defined location. The drop point may be a final location or an intermediate location of the path to be travelled by the plurality of movable-bots.

In one embodiment, the one or more operations associated with each of the plurality of operation paths includes charging a movable-bot at a charging point. As discussed above, the operating power of the plurality of movable-bots may be electrical power supplied through rechargeable batteries. In one example, the rechargeable batteries may be Lithium batteries. Furthermore, the rechargeable batteries need to be recharged after a certain period of use and/or consumption of power for performing the operations. To provide power to the plurality of movable-bots, charging stations are arranged at the charging points. The server arrangement may analyse the information about a power source of the movable bots. When the batteries need recharging, the plurality of movable-bots may be instructed to travel to the charging stations arranged at charging points.

In one embodiment, the method further includes instructing each of the plurality of movable-bots to perform one or more corresponding operations associated with an operation path when moving along the operation path of the plurality of operation paths. For example, the server arrangement is operable to instruct each of the plurality of movable-bots to perform one or more corresponding operations associated with an operation path when moving along the operation path of the plurality of operation paths. In an example, the plurality of operations such as receive an item from the pickup point, drop an item at the drop point, or charging a movable-bot, may be assigned to each of the individual bots based on the plurality of path attributes and the duty-cycle. In one example, separate operation paths from the plurality of operation paths may be assigned to receive the item at the pickup point, deliver the item at a drop point, and charge a movable-bot at a charging point. In an example, the separate operation paths to receive the item at the pickup point, deliver the item at a drop point, and charge a movable-bot at a charging point, conjoin with the conveyance path to form a closed loop. The conjoined path may exhibit a distinguished path attribute according to the operation associated therewith.

The method for handling items using the plurality of movable-bots includes instructing each of the plurality of movable-bots to synchronize a movement thereof based on the plurality of path attributes when moving along the conveyance path. For example, the server arrangement is operable to instruct each of the plurality of movable-bots to synchronize a movement thereof based on the plurality of path attributes when moving along the conveyance path. The movement of the plurality of movable-bots may be synchronised in such a manner that there is no collision while maintaining a well-defined maximum speed, a well-defined maximum acceleration, and the so forth. Each the plurality of movable-bots are to move in the same direction along the conveyance path (e.g., in a clockwise direction) with a maximum speed (e.g., 80 kilometers per hour).

Moreover, the plurality of movable-bots may be configured to enable the movement according to the plurality of path attributes and duty-cycle when moving along the conveyance path. The entry and exits may be considered as phase change positions. For example, the entry points and exit points may enable a deceleration or acceleration of the plurality of movable-bots. Collectively, an average speed of each of the plurality of movable-bots on the conveyance path may be accommodated according to the plurality of path attributes associated therewith. Specifically, the time scheduling and positioning of the movable-bots are predetermined to avoid collisions and accidental hazards. Furthermore, the merging and demerging of the plurality of movable-bots may occur while interchanging between the conveyance path and the plurality of operation paths. In one example, a movable-bot (e.g., A1) may shift from conveyance path to the operation path, demerging therefrom, to deliver an item to a drop location. Subsequently, the movable-bot (e.g., A1) may return to the conveyance path from the operation path, merging thereto. Beneficially, the system ensures that operations of merging and demerging are achieved smooth and no congestion occurs thereby.

In one embodiment, synchronizing the movement of each of the plurality of movable-bots includes maintaining a separation distance of each movable-bot with respect to nearby movable-bots. In order to avoid congestion, a separation distance of each movable-bot with respect to nearby movable-bots is maintained. Furthermore, the separation distance may be predetermined, and or maybe calculated based on the dimensions of the movable-bot and the distance to be travelled while performing the operations. Moreover, the separation distance may provide an appropriate gap between each of movable-bots for merging and demerging between different paths.

In one embodiment, the separation distance for the duty-cycle is based on a number of the movable-bots moving along the conveyance path. Further, the separation distance for the duty-cycle may be determined according to the number of the movable-bots involved therein and moving along the conveyance path. Furthermore, the separation distance for the duty-cycle may be determined based on the number of the movable-bots assigned to perform the required number of operations in a particular path. Herein, the duty-cycle may constitute operation of the one of the movable-bots along one of the conveyance path and the operation path, or the overall operation of the plurality of movable-bots along the conveyance path and the operation path for sorting of the one or more items, or a combination thereof.

In one embodiment, the separation distance is calculated by determining a predefined safe-distance between first and second movable-bots of the plurality of movable-bots. The server arrangement is operable to calculate the separation distance by determining a predefined safe-distance between the first and second movable-bots of the plurality of movable-bot. It will be appreciated that a predefined safe-distance between the first and second movable-bots may provide an appropriate gap that avoids congestion while moving along the conveyance path. The predefined safe-distance may include the gap between the front and rear movable-bots moving in the same path, as well as a side distance between two or more movable-bots moving along two or more side or parallel paths. In one example, the predefined safe-distance may be three to five times the length of the movable-bot.

In one embodiment, the method further includes adapting a speed of a third movable-bot entering the conveyance path between the first and second movable-bots, to maintain the predefined safe-distance of the third movable-bot with respect to the first and second movable-bots. In particular, the server arrangement is operable to adapt a speed of a third movable-bot entering the conveyance path between the first and second movable-bots to maintain the predefined safe-distance of the third movable-bot with respect to the first and second movable-bots. The accommodation of a third movable-bot entering the conveyance path between the first and second movable-bots is based on various factors such as average speed of the first and second movable-bots, the separation distance for the duty-cycle, the predefined safe-distance between the first and second movable-bots, and the like. Specifically, the speed of the third movable-bot is adjusted on the basis of the predefined safe-distance between the first and second movable-bots, and the average speed thereof. Additionally, during merging of the third movable-bot between the first and second movable-bots, the speed of the third movable-bot is regulated to maintain the predefined safe-distance and the separation distance with respect to the first and second movable-bots.

In one embodiment, the method further includes instructing the third movable-bot to enter the conveyance path in an entering time-window, where the entering time-window is based on the separation distance being greater than the predefined safe-distance. In particular, the server arrangement is operable to instruct the third movable-bot to enter the conveyance path in an entering time-window, where the entering time-window is based on the separation distance being greater than the predefined safe-distance. Specifically, the entering time-window, for the third movable-bot entering the conveyance path, is determined based on the separation distance being greater than the predefined safe-distance, of the first and second movable-bots. In one or more examples, the entering time-window may be calculated to be less than or equal to the separation distance between the first and second movable-bots divided by the speed of the second movable-bot.

In an example, a movable bot returning from the operation path to the conveyance path may need to regulate the speed according to the average speed of the bots moving along the conveyance path and the entering time-window allowed therebetween. Moreover, the entering time-window relates to a phase, duration, and the like, that is a fractional duration of the total time duration. Furthermore, the entering time-window may be programmed in accordance with the separation distance being greater than the predefined safe-distance, of the first and second movable-bots. Additionally, the separation distance may differ with time to time and on the occurrence of transitions of the one or more operations. However, to avoid congestions and collisions, the predefined safe-distance may not allow any convergence thereof. Therefore, during merging and demerging, the movable may adjust to a perfect time duration to accommodate in the entering time-window.

In one embodiment, the method further includes providing the entering time-window at a predefined frequency within the duty-cycle, where the entering time-window corresponds to a predefined duration. In particular, the server arrangement is operable to provide the entering time-window at a predefined frequency within the duty-cycle, where the entering time-window corresponds to a predefined duration. It will be appreciated that the term "predefined frequency" relates to the average speed of the movable-bots in view of the separation distance. Furthermore, the merging and demerging of the movable bots at the entering time-window may be performed by maintaining an appropriate duration of transitions there between. Therefore, the transitions may be performed at the predefined frequency within the duty-cycle that corresponds to the entering time-window of the movable bots. In an instance, the movable bot may wait for a perfect time-window corresponding to the predefined duration.

Similar to the entering time-window, the method further includes instructing, for example, the third movable-bot to exit the conveyance path into one or the operation paths during the duty-cycle in an exiting time-window, where the exiting time-window is based on a separation distance between, for example, the first moveable-bot and the second moveable-bot travelling in the operation path being greater than a predefined safe-distance for entering the operation path. The calculations for the exiting time-window can be contemplated to be similar to the ones used for entering time-window. It may further be appreciated that the duty-cycle may include other types of time-windows, such as time-windows for entering and exiting a scanning point, time-windows for entering and exiting a charging point, and the like.

In one embodiment, the conveyance path and/or plurality of operation paths are defined using a guiding arrangement, and where the guiding arrangement includes at least one of: a RADAR mechanism and a LIDAR mechanism. In some examples, the conveyance path and/or plurality of operation paths may include tracks, strips, and so forth. Additionally, the conveyance path and/or plurality of operation paths may be defined using the guiding arrangement to define the distance, direction, configuration of the average speed, acceleration, time duration, and so forth. As described above, the guiding arrangement can be positioned at certain points along the conveyance path to allow movable-bots to travel at higher speeds, for example one or more turns along the conveyance path.

In one embodiment, each of the plurality of movable-bots includes the actuating arrangement having at least two degrees of freedom, to perform the one or more operations, and where the actuating arrangement includes at least one of a tilting mechanism, an oscillating mechanism and a rolling mechanism. It will be appreciated that the term "actuating arrangement" relates to a mechanical component coupled to the plurality of movable-bots to perform the one or more operations. Furthermore, the actuating arrangement with at least two degrees of freedom can perform one of a tilting mechanism, an oscillating mechanism and a rolling mechanism. Thus, the actuating arrangement enables the plurality of movable-bots to pick-up the items, drop the items, sorting, transferring, and so forth.

In one embodiment, each of the plurality of movable-bots are autonomous movable robots. Furthermore, each of the plurality of movable-bots may be versatile and capable of performing operations automatically. Moreover, each of the plurality of movable-bots may be programmed to perform one or more operations while travelling on the plurality of paths.

Figure 1:
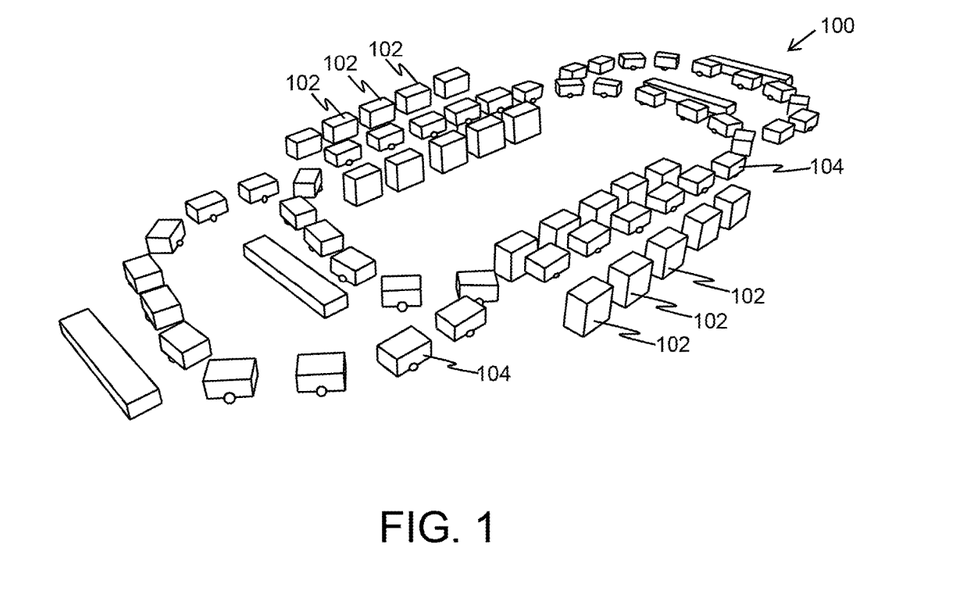
FIG. 1 is a diagrammatic illustration of a system for handling items using a plurality of movable-bots, in accordance with various exemplary implementations of the present disclosure.

Referring to FIG. 1, illustrated is a diagrammatic view of a system 100 for handling items 102 using a plurality of movable-bots 104, in accordance with an exemplary implementation of the present disclosure. The plurality of movable-bots 104 is configured to sort the items 102 within the system 100. Furthermore, the plurality of movable-bots 104 follows one or more paths to travel and sort the items 102 placed thereon. The system 100 includes a server arrangement (shown in FIG. 2) operable to define a conveyance path (shown in FIG. 2) to be followed by the plurality of movable-bots 104, where the conveyance path is configured to be a closed loop. The server arrangement is also operable to define a plurality of attributes associated with the conveyance path, for each of the plurality of movable-bots 104. The server arrangement is also operable to instruct each of the plurality of movable-bots 104 to synchronize a movement thereof based on the plurality of path attributes when moving along the conveyance path. The server arrangement is further operable to define a plurality of operation paths (shown in FIG. 2) for the duty-cycle, where the conveyance path and each of the plurality of operation paths are generally combined to form a fixed-closed loop. The closed loop may be temporarily fixed according to some embodiments. For example, The closed loop may be temporarily fixed until one or more additional operation paths or one or more mobile-bots are added that would require an adjustment to the conveyance path.

Figure 2:
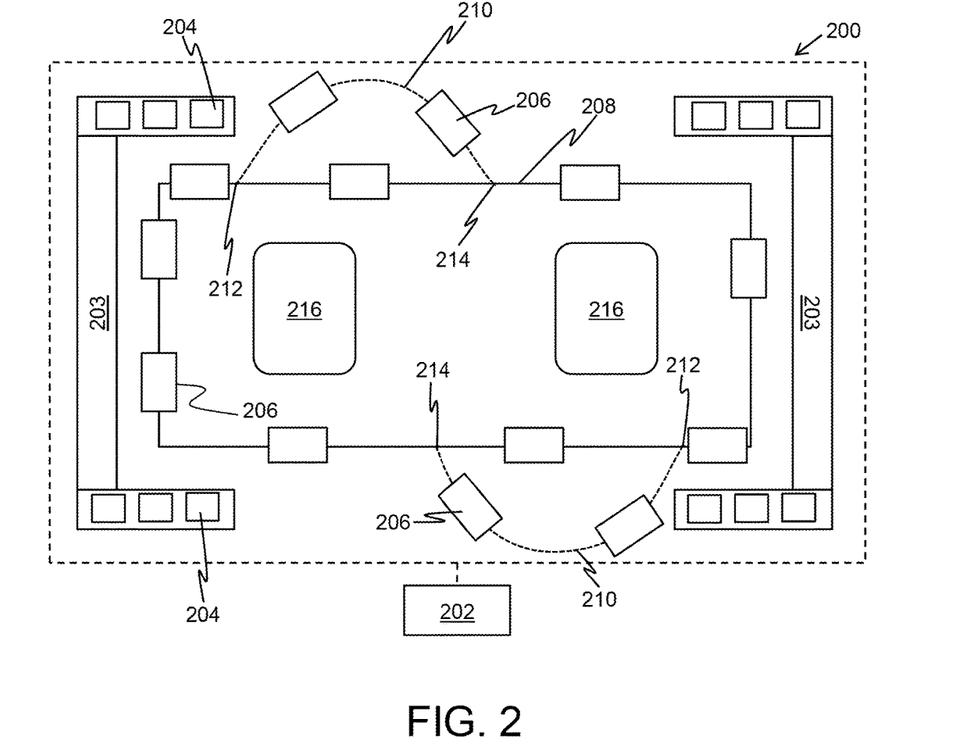
FIG. 2 is a schematic illustration of a system for handling items using a plurality of movable-bots showing a conveyance path and an operation path therein, in accordance with various exemplary implementations of the present disclosure.

Referring to FIG. 2, illustrated is a schematic of a system 200 for handling items 204, obtained via plurality of chutes 203, using the plurality of movable-bots 206, in accordance with an exemplary embodiment of the present disclosure. The system 200 includes a server arrangement (represented by the numeral 202) operable to define a conveyance path 208 to be followed by a plurality of movable-bots 206, where the conveyance path 208 is configured to be a closed loop. The server arrangement 202 is also operable to define a plurality of attributes associated with the conveyance path 208 for each of the plurality of movable-bots 206. The server arrangement 202 is also operable to instruct each of the plurality of movable-bots 206 to synchronize a movement thereof based on the plurality of path attributes when moving along the conveyance path 208. The server arrangement 202 is further operable to define a plurality of operation paths 210 for the duty-cycle, where the conveyance path 208 and each of the plurality of operation paths 210 combine to form a fixed-closed loop. In the exemplary illustration of FIG. 2, the system 200 is shown to include two operation paths 210.

Generally, the conveyance path 208 may be the larger path in which the movable-bots 206 are operated at a high speed (e.g., maximum speed), whereas operation paths 210 may be relatively smaller paths compared to the conveyance path 208 in which the movable-bots 206 are operated at a low speed (e.g., minimum speed). In one embodiment, a length of the conveyance path constitutes about 60 to 100 percent of a total length of the fixed-closed loop. In one embodiment, a total length of the plurality of operation paths constitutes about 0 to 40 percent of the total length of the fixed-closed loop. The plurality of movable-bots 206 may enter the operation path 210 from the conveyance path 208 at an entry point 212, and leave the operation path 210 for the conveyance path 208 at an exit point 214. The plurality of movable-bots 206 are operable to receive and deliver the items 204. In some examples, the system 200 also includes charging points 216 for the movable-bots 206, and the server arrangement 202 is operable to direct the movable-bots 206 for the operation of charging the plurality of movable-bots 206 at the charging point 216.

Figure 3A:
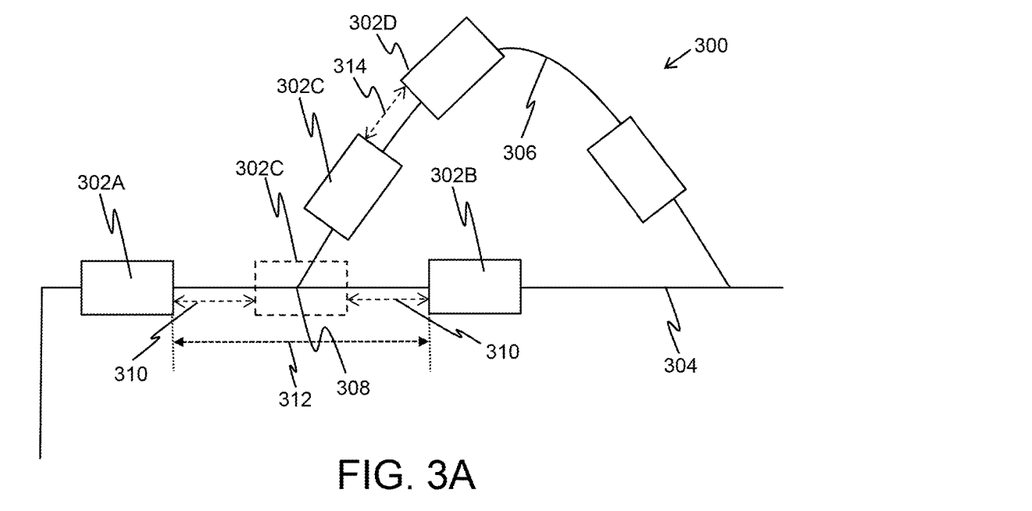
FIGS. 3A and 3B are schematic illustrations of a portion of a system for handling items using a plurality of movable-bots depicting concepts of safe-distance and time-window, respectively, in accordance with various exemplary implementations of the present disclosure.

Referring to FIG. 3A, illustrated is a schematic of a portion of a system 300 for handling items using a plurality of movable-bots 302 depicting a concept of safe-distance, in accordance with an exemplary embodiment of the present disclosure. As depicted in FIG. 3A, one or more of the plurality of movable-bots 302 leaves a conveyance path 304 and enters an operation path 306 at an entry point 308. The plurality of movable-bots 302 may be adapted to maintain a separation distance with respect to nearby movable-bots 302. For example, as illustrated, the movable-bot 302C, when travelling in the conveyance path 304, maintains a separation distance 310 with other near-by movable-bots 302A and 302B, where the separation distance 310 is within the pre-defined safe-distance. Further, as the movable-bot 302C leaves the conveyance path 304 at the entry point 308, according to some embodiments, it is ensured that a separation distance 312 between the movable-bots 302A and 302B is within the pre-defined safe-distance. Furthermore, as the movable-bot 302C enters the operation path 306 at the entry point 308, according to some embodiments, it is ensured that a separation distance 314 between the movable-bots 302C and 302D (already in the operation path 306), where the separation distance 314 is within the pre-defined safe-distance.

In some embodiments, the plurality of movable-bots 302 exit the conveyance path 304 and/or enter the operation path 306 within a pre-defined time-window, which is co-related to the safe-distance such that the entering of the movable-bot 302C into the operation path 306 within the pre-defined time-window results in maintaining the safe-distance, which is otherwise not achievable. The time-window may be based on the relative position and speed of nearby movable-bots 302.

Figure 3B:
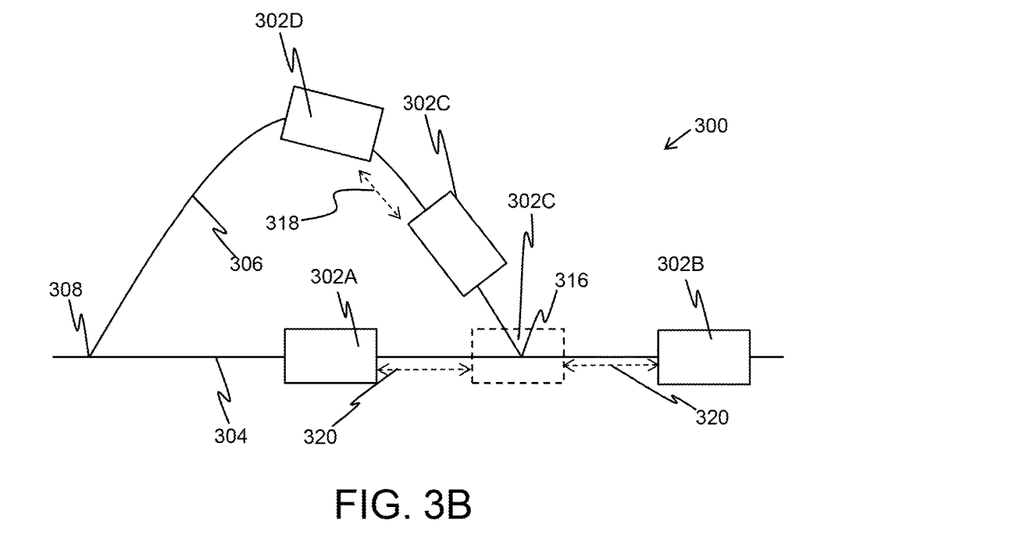

Referring to FIG. 3B, illustrated is a schematic of a portion of the system 300 for handling items using a plurality of movable-bots 302 depicting a concept of safe-distance, in accordance with an exemplary embodiment of the present disclosure. As depicted in FIG. 3B, one or more of the plurality of movable-bots 302 leaves the operation path 306 and enters the conveyance path 304 at an exit point 316. The plurality of movable-bots 302 may be adapted to maintain a separation distance with respect to nearby movable-bots 302. For example, as illustrated, the movable-bot 302C, when travelling in the operation path 306, maintains a separation distance 318 with other near-by movable-bots, like movable-bot 302D, where the separation distance 318 is within the pre-defined safe-distance. Further, as the movable-bot 302C leaves the operation path 306 and enters the conveyance path 304 at the exit point 316, according to some embodiments, it is ensured that a separation distance 320 is available/maintained between the movable-bots 302A and 302C, and the movable-bots 302B and 302C, where the separation distance 320 is within the pre-defined safe-distance.

In some embodiments, the plurality of movable-bots 302 exit the operation path 306 and/or enter the conveyance path 304 within a pre-defined time-window, which is co-related to the safe-distance such that the entering of the movable-bot 302C into the conveyance path 304 within the pre-defined time-window would result in maintaining of the safe-distance, which is otherwise not achievable. The time-window may be based on the relative position and speed of nearby movable-bots 302.

In one embodiment, the plurality of movable-bots 302 are configured to adapt a speed of the movable-bot 302C entering/exiting the operation path 306, to maintain the predefined safe-distance of the movable-bot 302C with respect to the movable-bots 302A-B and/or the movable-bot 302D. Notably, the movable-bot 302C enters the operation path 306 in an entering time-window, where the entering time-window is based on the separation distance 310 being greater than the predefined safe-distance 312. Further, according to some embodiments, the movable-bot 302C leaves the operation path 306 in an exiting time-window, where the exiting time-window is based on the separation distance 320 being greater than the predefined safe-distance 312. Generally, the time-windows may be based on the relative position and speed of nearby movable-bots 302.

Figure 4:
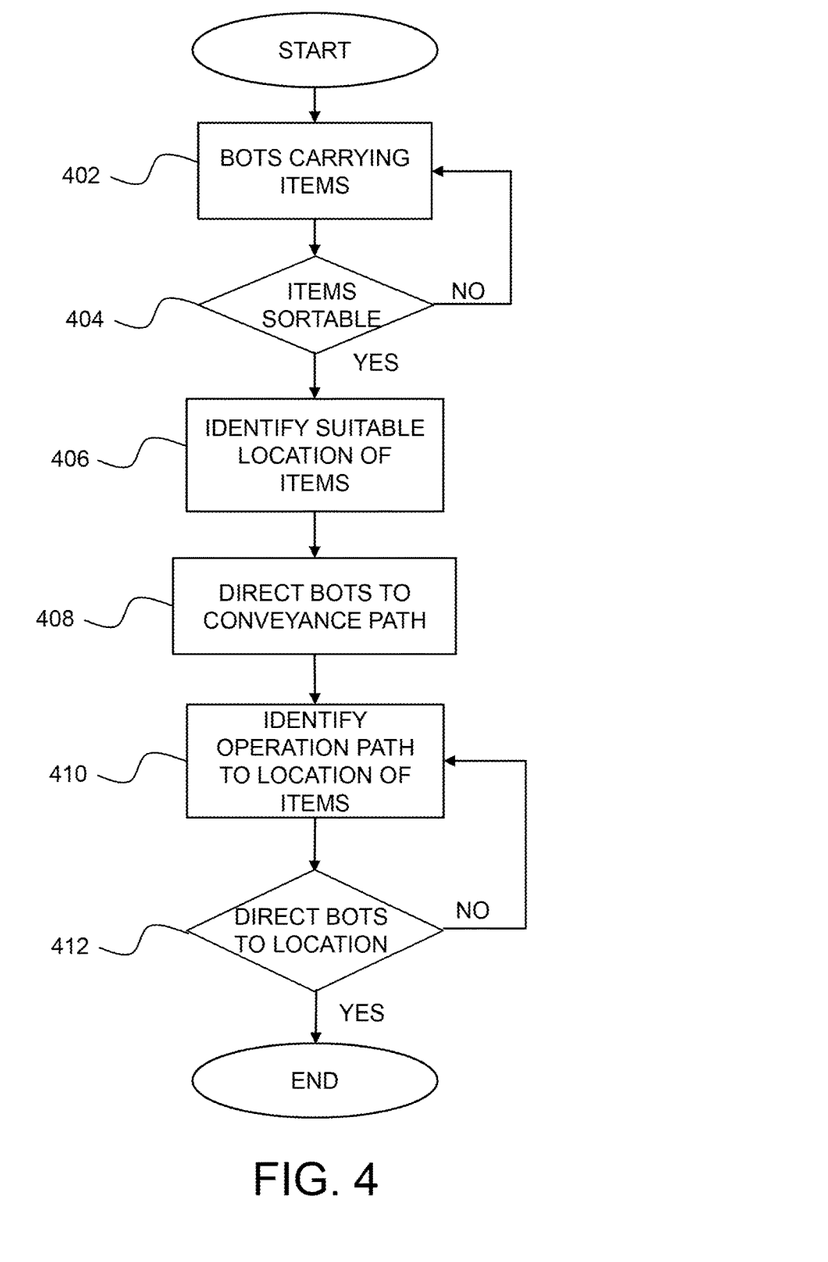
FIG. 4 is an illustration of a process flow chart for sorting items using a plurality of movable-bots, in accordance with an embodiment of the present disclosure.

Referring to FIG. 4, illustrated is a block diagram of process flow chart 400 for sorting items using a plurality of movable-bots, in accordance with an embodiment of the present disclosure. The process may start at step 402, where it is checked whether the movable-bots are carrying any items. The process proceeds to step 404, where it is determined whether the carried item is sortable or not. If the carried item is not sortable, the process returns to step 402 where it is again checked after a while if the item has now become sortable (e.g., due to availability of space on conveyor belt or the like). If the item is sortable, the process proceeds to step 406, where a suitable location for dropping off the item is selected.

The process proceeds to step 408, the movable-bot is directed to the conveyance path corresponding to (or, for reaching) the selected location. The process proceeds to step 410, where an operation path corresponding to the selected location is identified, which leads to the selected location. The process proceeds to step 412, where the movable-bot is directed to the selected location, via the operation path, to complete the selected operation. If the operation is not completed due to any reason (e.g., due to unavailability of conveyor belt or the like), then the process returns to step 410 where the movable-bot is again directed to the selected location after waiting for a certain pre-selected period of time.

Figures 5A, 5B:
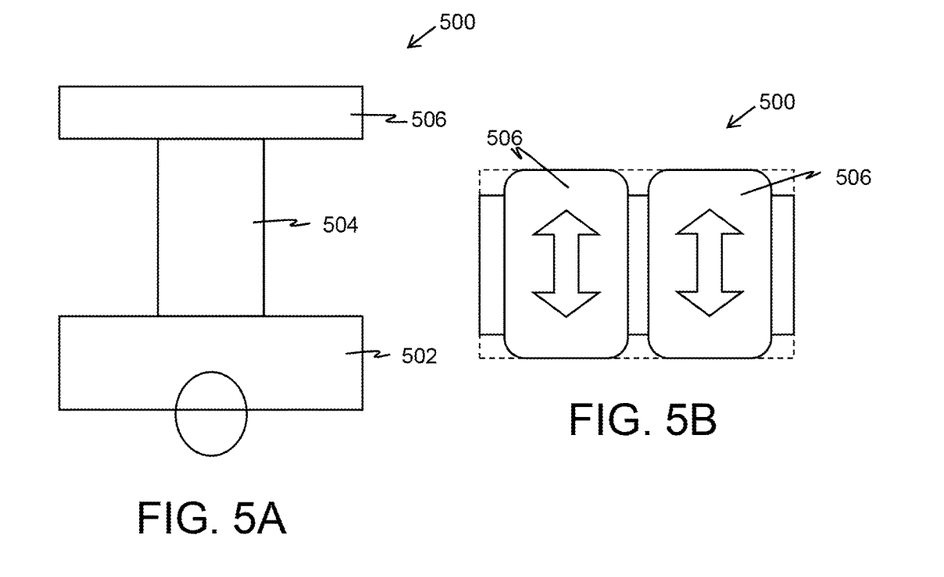
Figure 5C:
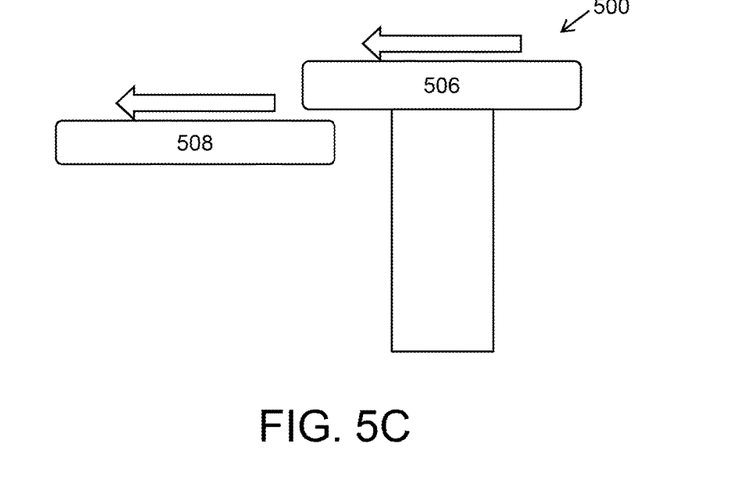

Referring to FIGS. 5A-5B, illustrated are various embodiments of the movable-bots 500 that can be implemented for carrying out the operations of the present disclosure. Further, FIG. 5C illustrate a dropping-off operation being carried out by the movable-bot 500. As illustrated in FIG. 5A, the movable-bot 500 includes an automated guided vehicle (AGV) 502, a supporting structure 504 placed on the AGV and a carriage or a conveyor 506 supported by the supporting structure 504. As shown in FIG. 5B, the conveyor 506 may travel along the direction indicated by the arrows therein. As shown in FIG. 5C, when the movable-bot 500 reaches in proximity to a conveyor belt 508, the conveyor 506 of the movable-bot 500 is activated to move along the direction indicated by a corresponding arrow so that the item therein is dropped-off to the conveyor belt 508 and transported along the direction as indicated by a corresponding arrow.

Figure 6:
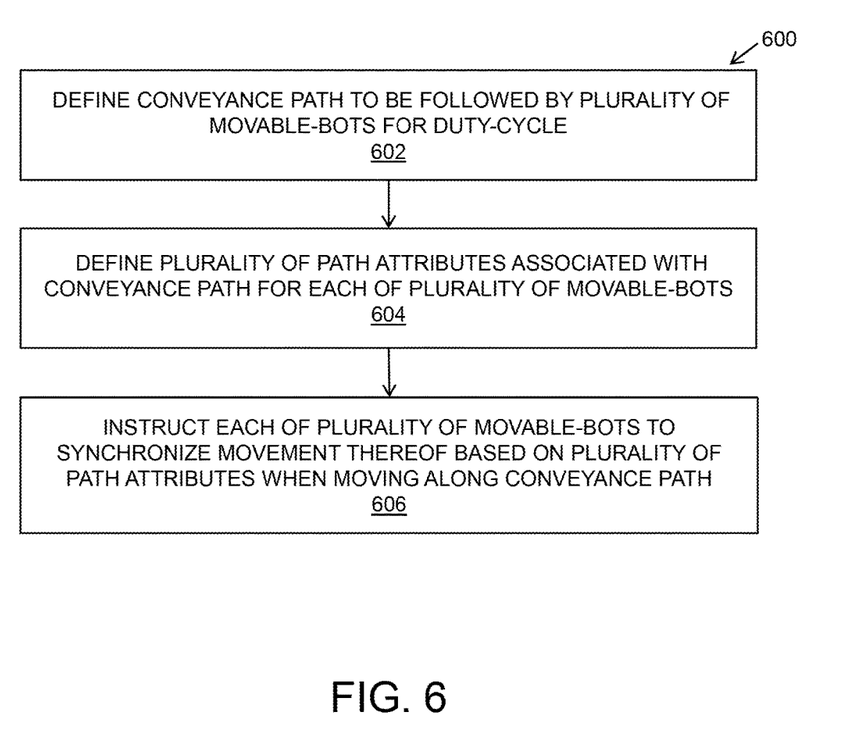
FIG. 6 is an illustration of steps of a method for handling items using a plurality of movable-bots, in accordance with an embodiment of the present disclosure.

Referring to FIG. 6, illustrated is a process 600 for handling items using a plurality of movable-bots, in accordance with an embodiment of the present disclosure. The process may start at step 602, where a conveyance path to be followed by the plurality of movable-bots is defined. The process proceeds to step 604, where a plurality of path attributes associated with the conveyance path is defined for each of the plurality of movable-bots. The process proceeds to step 606, where each of the plurality of movable-bots is instructed to synchronize a movement thereof based on the plurality of path attributes when moving along the conveyance path.

The steps 602 to 606 are only illustrative and other alternatives can also be provided where one or more steps are added, one or more steps are removed, or one or more steps are provided in a different sequence without departing from the scope of the claims herein.

Figure 7:
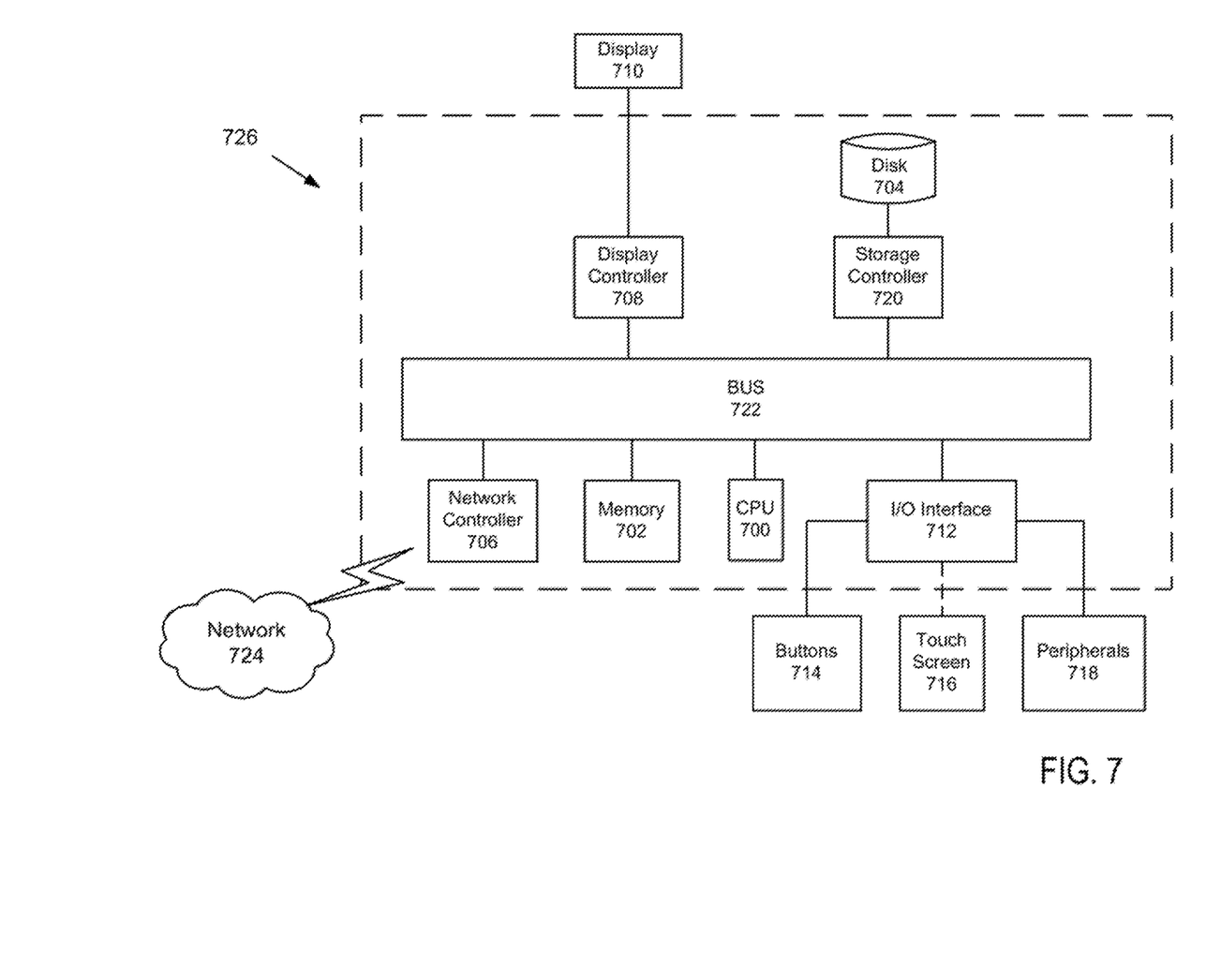
FIG. 7 illustrates a block diagram of a computer according to one example.

In some embodiments, the functions and processes of the server arrangement 202 may be implemented by a computer 726. Next, a hardware description of the computer 726 according to exemplary embodiments is described with reference to FIG. 7. In FIG. 7, the computer 726 includes a CPU 700 which performs the processes described herein. The process data and instructions may be stored in memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 726 communicates, such as a server or computer.

Further, the claimed advancements may be provided as a utility application, background daemon, or component of an operating system, or combination thereof, executing in conjunction with CPU 700 and an operating system such as Microsoft® Windows®, UNIX®, Oracle® Solaris, LINUX®, Apple macOS® and other systems known to those skilled in the art.

In order to achieve the computer 726, the hardware elements may be realized by various circuitry elements, known to those skilled in the art. For example, CPU 700 may be a Xenon® or Core® processor from Intel Corporation of America or an Opteron® processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

The computer 726 in FIG. 7 also includes a network controller 706, such as an Intel Ethernet PRO network interface card from Intel Corporation of America, for interfacing with network 724. As can be appreciated, the network 724 can be a public network, such as the Internet, or a private network such as LAN or WAN network, or any combination thereof and can also include PSTN or ISDN sub-networks. The network 724 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 726 further includes a display controller 708, such as a NVIDIA® GeForce® GTX or Quadro® graphics adaptor from NVIDIA Corporation of America for interfacing with display 710, such as a Hewlett Packard® HPL2445w LCD monitor. A general purpose I/O interface 712 interfaces with a keyboard and/or mouse 714 as well as an optional touch screen panel 716 on or separate from display 710. General purpose I/O interface also connects to a variety of peripherals 718 including printers and scanners, such as an OfficeJet® or DeskJet® from Hewlett Packard®.

The general purpose storage controller 720 connects the storage medium disk 704 with communication bus 722, which may be an ISA, EISA, VESA, PCI, or similar, for interconnecting all of the components of the computer 726. A description of the general features and functionality of the display 710, keyboard and/or mouse 714, as well as the display controller 708, storage controller 720, network controller 706, and general purpose I/O interface 712 is omitted herein for brevity as these features are known.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for handling items using a plurality of movable-bots, the method comprising:
   defining, by circuitry of a server arrangement, a conveyance path to be followed by the plurality of movable-bots, the conveyance path configured as a closed loop;
   defining, by the circuitry of the server arrangement, for each of the plurality of movable-bots, a plurality of path attributes associated with the conveyance path;
   instructing, by the circuitry of the server arrangement, each of the plurality of movable-bots to synchronize a movement with respect to at least one other movable-bot based on the plurality of path attributes when moving along the conveyance path;
   defining, by the circuitry of the server arrangement, a plurality of operation paths formed outside of the conveyance path, a combination of the conveyance path and each of the plurality of operation paths forming a fixed-closed loop;
   defining, by the circuitry of the server arrangement, for each of the plurality of movable-bots, one or more operations associated with each of the plurality of operation paths; and
   instructing, by the circuitry of the server arrangement, each of the plurality of movable-bots to perform one or more corresponding operations associated with an operation path of the plurality of operation paths when leaving the conveyance path and entering the operation path.

2. The method according to claim 1, wherein a length of the conveyance path constitutes about 60 to 100 percent of a total length of the fixed-closed loop and a total length of the plurality of operation paths constitutes about 0 to 40 percent of the total length of the fixed-closed loop, wherein the length of the conveyance path being about 60 to 100 percent of the total length of the fixed-closed loop increases the average speed of the movable-bots during operation.

3. The method according to claim 1, wherein each of the movable-bots is configured to perform an operation while traversing the conveyance path without reducing the speed of the respective moveable-bot.

4. The method according to claim 1, wherein the one or more operations associated with each of the plurality of operation paths comprises one of:
retrieving identity information of an item at a scanning point, wherein the identity information comprises at least one of: a unique identifier of the item, a weight of the item and dimensions of the item;
receiving the item at a pickup point;
delivering the item at a drop point; and
charging a movable-bot at a charging point.

5. The system according to claim 1, wherein each of the plurality of movable-bots includes an actuating arrangement, having at least two degrees of freedom, to perform the one or more operations, and wherein the actuating arrangement includes at least one of: a tilting mechanism, an oscillating mechanism, and a rolling mechanism.

6. The method of claim 1, wherein the circuitry of the server arrangement controls each of the plurality of movable-bots to (i) exit the conveyance path and enter the operation path, and (ii) exit the operation path and re-enter the conveyance path.

7. The method according to claim 1, wherein the plurality of path attributes comprises:
a maximum speed permitted for each of the plurality of movable-bots,
a maximum acceleration permitted for each of the plurality of movable-bots,
an entry point, for each of the plurality of movable-bots, from each of the operation paths into the conveyance path, and
an exit point, for each of the plurality of movable-bots, from the conveyance path into each of the operation paths.

8. The method according to claim 7, wherein the maximum speed is in a range of 1.5 to 10 times of an effective speed of each movable-bot along the plurality of operation paths.

9. The method according to claim 1, wherein synchronizing the movement of each of the plurality of movable-bots comprises maintaining, by the circuitry of the server arrangement, a separation distance of each movable-bot with respect to the at least one other moveable-bot, wherein the at least one other moveable-bot is directly ahead or behind a respective one of the plurality of movable-bots.

10. The method according to claim 9, wherein the separation distance is based on a number of the movable-bots moving along the conveyance path.

11. The method according to claim 9, wherein the separation distance is calculated by determining a predefined safe-distance between a first and a second movable-bots of the plurality of movable-bots.

12. The method according to claim 11, further comprising configuring, by the circuitry of the server arrangement, a speed of a third movable-bot entering the conveyance path between the first and second movable-bots to maintain the predefined safe-distance of the third movable-bot with respect to the first and second movable-bots.

13. The method according to claim 12, further comprising instructing, by the circuitry of the server arrangement, the third movable-bot to enter the conveyance path in an entering time-window that is based on the separation distance being greater than the predefined safe-distance.

14. The method according to claim 13, further comprising providing, by the circuitry of the server arrangement, the entering time-window at a predefined frequency, wherein the entering time-window corresponds to a predefined duration.

15. A system for handling items using a plurality of movable-bots, the system comprising:
a server arrangement operable to:
define a conveyance path to be followed by the plurality of movable-bots, the conveyance path configured as a closed loop;
define, for each of the plurality of movable-bots, a plurality of path attributes associated with the conveyance path;
instruct each of the plurality of movable-bots to synchronize a movement with respect to at least one other movable-bot based on the plurality of path attributes when moving along the conveyance path;
define a plurality of operation paths formed outside of the conveyance path, a combination of the conveyance path and each of the plurality of operation paths forming a fixed-closed loop;
define, for each of the plurality of movable-bots, one or more operations associated with each of the plurality of operation paths; and
instruct each of the plurality of movable-bots to perform one or more corresponding operations associated with an operation path of the plurality of operation paths when leaving the conveyance path and entering the operation path.

16. The system according to claim 15, wherein a length of the conveyance path constitutes about 60 to 100 percent of a total length of the fixed-closed loop and a total length of the plurality of operation paths constitutes about 0 to 40 percent of the total length of the fixed-closed loop, wherein the length of the conveyance path being about 60 to 100 percent of the total length of the fixed-closed loop increases the average speed of the movable-bots during operation.

17. The system according to claim 15, wherein each of the movable-bots is configured to perform an operation while traversing the conveyance path without reducing the speed thereof of the respective moveable-bot.

18. The system according to claim 15, wherein the conveyance path and plurality of operation paths are defined using a guiding arrangement that includes at least one of a RADAR mechanism and a LIDAR mechanism.

19. The system according to claim 15, wherein each of the plurality of movable-bots are autonomous movable robots.

20. The system according to claim 15, wherein the plurality of path attributes comprises:
a maximum speed permitted for each of the plurality of movable-bots,
a maximum acceleration permitted for each of the plurality of movable-bots,
an entry point, for each of the plurality of movable-bots, from each of the operation paths into the conveyance path, and
an exit point, for each of the plurality of movable-bots, from the conveyance path into each of the operation paths.

21. The system according to claim 20, wherein the maximum speed is in a range of 1.5 to 10 times of an effective speed of each movable-bot along the plurality of operation paths.

22. The system according to claim 15, wherein the one or more operations associated with each of the plurality of operation paths comprises one of:

retrieval of identity information of an item at a scanning point, wherein the identity information comprises at least one of: a unique identifier of the item, a weight of the item and dimensions of the item;

receive the item at a pickup point;

deliver the item at a drop point; and charge a movable-bot at a charging point.

23. The system according to claim 22, further comprising at least one:

a charging station arranged at the charging point, and a scanner arranged at the scanning point.

24. The system according to claim 15, wherein synchronization of the movement of each of the plurality of movable-bots comprises maintenance of a separation distance of each movable-bot with respect to the at least one other moveable-bot, wherein the at least one other moveable-bot is directly ahead or behind a respective one of the plurality of movable-bots.

25. The system according to claim 24, wherein the separation distance is based on a number of the movable-bots moving along the conveyance path.

26. The system according to claim 24, wherein the server arrangement is further operable to calculate the separation distance by a determination of a predefined safe-distance between a first and a second movable-bots of the plurality of movable-bots.

27. The system according to claim 26, wherein the server arrangement is further operable to adapt a speed of a third movable-bot that enters the conveyance path between the first and second movable-bots, to maintain the predefined safe-distance of the third movable-bot with respect to the first and second movable-bots.

28. The system according to claim 27, wherein the server arrangement is further operable to instruct the third movable-bot to enter the conveyance path in an entering time-window that is based on the separation distance being greater than the predefined safe-distance.

29. The system according to claim 28, wherein the server arrangement is further operable to provide the entering time-window at a predefined frequency, wherein the entering time-window corresponds to a predefined duration.

\* \* \* \* \*